UNITED STATES PATENT OFFICE 2,571,115

ISOLATION OF BACTERIAL MUTANTS

Bernard D. Davis, New York, N. Y.

No Drawing. Application November 30, 1949,
Serial No. 130,337

2 Claims. (Cl. 195—79)

(Granted under the act of March 3, 1883, as
amended April 30, 1928; 370 O. G. 757)

The invention described herein may be manufactured and used by or for the Government of the United States for governmental purposes without payment to me of any royalty thereon in accordance with the provisions of the Act of April 30, 1928 (ch. 460, 45 Stat. L. 467).

This invention relates to a method for the separation of biochemically deficient bacterial mutants from a non-mutant parent strain.

It is a simple matter to isolate bacterial mutants when the mutants can proliferate or survive in an environment which suppresses the parent strain. There is consequently no difficulty in obtaining mutants, even of low frequency, which differ from the parent strain by being resistant to antibacterial chemicals or viruses, or by having decreased nutritional requirements. Mutants with increased nutritional requirements, however, have been much less convenient to isolate. Usually it has been necessary to resort to random selection of colonies plated on agar.

Accordingly, it is an object of this invention to provide a method of obtaining biochemically deficient mutants from very much larger populations of non-mutant parent strains. Other objects and advantages will be apparent or will appear hereinafter.

These objects and advantages are accomplished in accordance with the present invention by the method for the separation of biochemically deficient bacterial mutants from a non-mutant parent stock which comprises cultivating the mutant and non-mutant containing population in an enriched medium which is capable of supporting the mutant and non-mutant strains, eliminating the mutant supporting growth factor present in the thus treated medium which is thereby rendered inadequate for said mutant population but which is adequate for said non-mutant population, eliminating the sterilizing factor, and cultivating the thus treated population in an enriched medium capable of supporting the mutant strain.

Suitable mutants for treatment in accordance with this invention include those bacterial mutants which are biochemically deficient; i. e., those mutants which are incapable of generating or producing within their system sufficient quantities of one or more specific chemical substances necessary which permit them to proliferate or survive. In other words, they have increased nutritional requirements over the nutritional requirements of the non-mutant strain. As an example of the type of deficiencies referred to, a variety of mutants of Escherichia Coli ("Waksman" strain ATCC #9637) have been obtained by the technique of this invention which have individual requirements for all the naturally occurring amino acids except alanine, aspartic acid, and hydroxyproline; for several multiple sets of acids; for the naturally occurring purines or their nucleosides or nucleotides; for the naturally occurring pyrimidines or their nucleosides or nucleotides; or the vitamins biotin, niacin, p-amino benzoic acid, thiamin, pyridoxin and panthothenic acid; and for unidentified factors in yeast extract. Mutants requiring vitamins have been isolated with less efficiency than the others; however, there is evidence that the syntrophic effect is much more striking with at least some of the vitamins, which act as nutrilites in much smaller traces, than with amino acids or nucleic acid components, which form the bulk of the protoplasm. The invention, however, is not to be construed as limited to this particular strain which has been given merely for purposes of illustration.

For purposes of this discussion an enriched medium is one to which one or more substances containing the specific growth factor deficiency of the mutant strain has been added. A minimal medium is one containing growth factors which will support or is adequate for the non-mutant strain but lacking in the specific growth factor deficiency of the mutant strain.

Suitable sterilizing factors for purposes of this invention include factors which will sterilize growing bacteria but which will not sterilize the resting mutant strain; i. e., the mutant strain in a minimal medium. Penicillin and similar bactericidal substances are presently preferred as sterilizing factors.

The following example will show how this invention may be carried out where mutants with an amino acid deficiency were sought; the invention, however, should not be construed as limited to this specific embodiment.

A 24-hour turbid culture of E. Coli ("Waksman" strain, ATCC #9637) in minimal medium was irradiated for two minutes in a quartz flask with constant shaking at a distance of 39 inches from an ultraviolet mercury lamp. This procedure reduced the viable count from $10^8$ per milliliter to $10^7$ per milliliter. (In most experiments the irradiation was more extensive.) One milliliter of the suspension was added to 2 ml. of minimal medium supplemented with 0.2% tryptic hydrolyzate of casein (Sheffield "N-Z-Case"), and the culture was incubated for 24 hours at 37° centigrade, at which time the viable count had reached $1.5 \times 10^9$ per milliliter. The bacteria were centrifuged, washed once with water and resuspended in 3 ml. of water. Serial tenfold dilutions of the suspension were prepared in water, and 0.1 ml. of each dilution added to 3 ml. of minimal medium containing 300 units of crystalline penicillin per milliliter. Following incubation at 37° centigrade for 24 and 48 hours, 0.1 ml. from each tube was plated in 10 ml. of minimal agar and in the same medium supplemented with 0.2% casein hydrolyzate. (It was determined that this dilution of the inoculum in agar was sufficient to remove the antibacterial effect of the penicillin.) Because of the frequently delayed appearance of colonies following exposure to penicillin, the plates were incubated for 48 rather than 24 hours. Table 1 shows the much larger numbers of colonies appearing in the enriched medium. Ten colonies chosen at random from one of the plates of enriched medium were all found to be biochemically deficient mutants, unable to grow on minimal agar. The mutant strains were spot-tested for their response to all of the naturally occurring amino acids. Because of the multiplication during the intermediate cultivation between irradiation and selection by penicillin, a number of replicate colonies with the same requirement, presumably a clone derived from a single mutation, are generally found in the same plate. In a typical experiment 5 to 10 distinct types are found on a single plate.

TABLE 1

*Survival of mutants and non-mutants after exposure to penicillin (300 U./Ml.) in minimal medium*

| Inoculum in 3-Ml. Tube | Colonies in Plating of 0.1 Ml. | | | |
|---|---|---|---|---|
| | After 24 Hrs. in Penicillin | | After 48 Hrs. in Penicillin | |
| | Minimal Medium | Enriched Medium | Minimal Medium | Enriched Medium |
| $10^6$ bacteria | ca. 400 | ca. 400 | 12 | 51 |
| $10^7$ | 36 | 152 | 1 | 67 |
| $10^8$ | 7 | 79 (10/10 mut.) | 0 | 36 |

E. Coli was the organism chosen because of its hardiness, its ability to grow on the simplest medium, its completely dispersed growth in liquid medium, and the large amount of information already available on its biochemical properties. Though it requires much higher concentrations of penicillin than those species which are considered fully sensitive to the drug, it fortunately shares with these species the requirement of bacterial growth for bactericidal action.

From the foregoing it is apparent that a new method for the separation of biochemically deficient mutants from a non-mutant strain has been disclosed.

Since many differing embodiments will occur to one skilled in the art, the invention is not to be construed as limited to the specific details illustrated and described since various changes may be made therein without departing from the spirit and scope thereof.

What is claimed is:

1. The method of isolating nutritionally deficient bacterial mutants from a parent stock which comprises cultivating a mutant and nonmutant containing population in an enriched medium containing all of the nutritional substances necessary to support the mutant and nonmutant strains, eliminating from the medium the mutant strain growth supporting nutritional substance thereby preventing the growth of said mutant strains, sterilizing the growing nonmutant strain with penicillin which will sterilize growing bacteria but which will not sterilize the resting mutant strain, eliminating the penicillin, and cultivating the thus treated population in an enriched medium capable of supporting the mutant strain.

2. The method of isolating nutritionally deficient bacterial mutants from a parent stock which comprises cultivating a mutant and nonmutant containing population in an enriched medium containing all of the nutritional substances necessary to support the mutant and nonmutant strains, irradiating said population with ultraviolet light, eliminating from the medium the mutant strain growth supporting nutritional substance thereby preventing the growth of said mutant strains, sterilizing the growing nonmutant strain with penicillin which will sterilize growing bacteria but which will not sterilize the resting mutant strain, eliminating the penicillin, and cultivating the thus treated population in an enriched medium capable of supporting the mutant strain.

BERNARD D. DAVIS.

REFERENCES CITED

The following references are of record in the file of this patent:

Elford, Ibid, pages 205 to 229.

Iverson et al., Science, 108, Oct. 8, 1948, pages 382, 383.

Foster, Chemical Activities of Fungi, Academic Press Inc., 1949, pages 228 to 235.